(12) United States Patent
Kim et al.

(10) Patent No.: US 11,130,093 B2
(45) Date of Patent: Sep. 28, 2021

(54) OXYGEN SUPPLYING APPARATUS

(71) Applicant: OXUS CO., LTD., Gyeonggi-do (KR)

(72) Inventors: Hyeon Seong Kim, Gyeonggi-do (KR); Seung Kwon Oh, Hanam-si (KR); Jee Soo Kwak, Yongin-si (KR); Kang Han Lee, Chuncheon-si (KR); Myeong Gu Kim, Pyeongtaek-si (KR)

(73) Assignee: OXUS CO., LTD., Gyeonggi-do (KR)

( * ) Notice: Subject to any disclaimer, the term of this patent is extended or adjusted under 35 U.S.C. 154(b) by 312 days.

(21) Appl. No.: 16/523,739

(22) Filed: Jul. 26, 2019

(65) Prior Publication Data

US 2021/0001265 A1    Jan. 7, 2021

(30) Foreign Application Priority Data

Jul. 1, 2019 (KR) ........................ 10-2019-0078524

(51) Int. Cl.
*B01D 53/047* (2006.01)
*B01D 53/053* (2006.01)

(52) U.S. Cl.
CPC ......... *B01D 53/053* (2013.01); *B01D 53/047* (2013.01); *B01D 2256/12* (2013.01); *B01D 2257/102* (2013.01); *B01D 2259/40003* (2013.01); *B01D 2259/40007* (2013.01); *B01D 2259/4062* (2013.01)

(58) Field of Classification Search
CPC .... B01D 53/04; B01D 53/047; B01D 53/053; B01D 2256/12; B01D 2257/102; B01D 2259/40003; B01D 2259/40007; B01D 2259/4062; C01B 13/0259
USPC .................. 96/121, 116; 95/130; 128/204.18
See application file for complete search history.

(56) References Cited

U.S. PATENT DOCUMENTS

| | | | | | |
|---|---|---|---|---|---|
| 3,662,135 | A | * | 5/1972 | Clark ..................... | H01H 33/55 218/43 |
| 5,071,453 | A | * | 12/1991 | Hradek ............... | A61M 16/101 96/111 |
| 7,294,170 | B2 | * | 11/2007 | Richey, II ............... | F04B 25/00 95/8 |

(Continued)

FOREIGN PATENT DOCUMENTS

| KR | 10-2000-0030484 A | 6/2000 |
|---|---|---|
| KR | 10-2003-0017054 A | 3/2003 |

*Primary Examiner* — Frank M Lawrence, Jr.
(74) *Attorney, Agent, or Firm* — Rabin & Berdo, P.C.

(57) ABSTRACT

An oxygen supplying apparatus includes: an oxygen enriching module including a plurality of oxygen enriching units; a pressure boosting module which receives the oxygen-enriched gas from the oxygen enriching module and boosts pressure of the oxygen-enriched gas; and a controller controlling operations of the oxygen enriching module and the pressure boosting module. The pressure boosting module includes: a low-pressure tank which receives and stores the oxygen-enriched gas from the oxygen enriching module; a pressure booster which boosts pressure of the oxygen-enriched gas discharged from the low-pressure tank; a high-pressure tank stores the oxygen-enriched gas pressure-boosted by the pressure booster; and at least one bypass valve which is provided to a bypass passage for bypassing a portion of the pressure-boosted oxygen-enriched gas stored in the high-pressure tank to the low-pressure tank to regulate bypassing of the oxygen-enriched gas from the high-pressure tank to the low-pressure tank.

10 Claims, 2 Drawing Sheets

(56) References Cited

U.S. PATENT DOCUMENTS

| | | | |
|---|---|---|---|
| 7,445,660 B2 * | 11/2008 | Hart | B01D 53/047 95/26 |
| 2003/0173276 A1 * | 9/2003 | Arnaud | B01D 21/34 210/143 |
| 2007/0214960 A1 * | 9/2007 | Aylsworth | B01D 53/0454 95/130 |

* cited by examiner

OXYGEN SUPPLYING APPARATUS

CROSS-REFERENCE TO RELATED APPLICATION

This application claims priority to and the benefit of Korean Patent Application No. 10-2019-0078524 filed in the Korean Intellectual Property Office on Jul. 1, 2019, the entire contents of which are incorporated herein by reference.

TECHNICAL FIELD

The present invention relates to an apparatus for supplying oxygen which concentrates and supplies oxygen.

BACKGROUND ART

An oxygen concentration device separates and enriches oxygen from ambient air and is widely used for home use, industrial use, medical use or the like.

Various types of an oxygen concentration device are being used, and a pressure swing adsorption (PSA) method among them is based on a principle of enriching oxygen using adsorbent and adopts a method of removing nitrogen in ambient air using adsorbent for concentrating oxygen. The PSA method does not emit pollutants and can be easily used since it only uses pressurized air and adsorbent.

Decreasing a pressure of pressurized air used in the pressure swing adsorption process is advantageous in view of an energy consumption, noise and a size and a durability of an apparatus. However, decrease of a pressure of pressurized air leads to decrease of pressure of product oxygen, so pressure boosting is necessary in order to obtain pressure of oxygen which is suitable for desired use.

For pressure boosting a method of using an AC compressor having fixed pressure boosting and flow performance characteristics or a method of using a BLDC compressor having variable flow performance characteristic may be considered. Since an AC compressor operates at a fixed RPM so as to generate a constant flow rate, it is not suitable for an oxygen supplying apparatus of a variable flow rate type. Although a BLDC compressor is efficient in a circumstance of variable oxygen consumption, a BLDC compressor has a problem in that it is expensive than an AC compressor and also requires a complicate control device.

DESCRIPTION OF THE INVENTION

Technical Problem

An object of the present invention is to provide an oxygen supplying apparatus which generates oxygen in accordance to an amount of oxygen use and boosts the pressure of oxygen when an amount of oxygen is not sufficient and in particular which can boost the pressure of oxygen using an AC compressor having a fixed pressure boosting characteristic in a cost effective manner and in a simple structure.

Technical Solution

An oxygen supplying apparatus according to an exemplary embodiment of the present invention includes: an oxygen enriching module including a plurality of oxygen enriching units which respectively generate oxygen-enriched gas and are respectively configured to be selectively operated; a pressure boosting module which receives the oxygen-enriched gas from the oxygen enriching module and boosts pressure of the oxygen-enriched gas; and a controller controlling operations of the oxygen enriching module and the pressure boosting module. The pressure boosting module includes: a low-pressure tank which receives and stores the oxygen-enriched gas from the oxygen enriching module; a pressure booster which boosts pressure of the oxygen-enriched gas discharged from the low-pressure tank; a high-pressure tank stores the oxygen-enriched gas pressure-boosted by the pressure booster; and at least one bypass valve which is provided to a bypass passage for bypassing a portion of the pressure-boosted oxygen-enriched gas stored in the high-pressure tank to the low-pressure tank to regulate bypassing of the oxygen-enriched gas from the high-pressure tank to the low-pressure tank.

The controller may control the oxygen enriching module such that the number of the oxygen enriching unit which is operating among the plurality of the oxygen enriching units is proportional to an amount of oxygen use, and the controller may control the bypass valve such that an amount of the oxygen-enriched gas bypassed from the high-pressure tank to the low-pressure tank via the bypass valve is reversely proportional to the number of the oxygen enriching unit which is operating.

The controller may calculate the amount of the oxygen use based on a change in pressure within the high-pressure tank.

The controller may calculate the amount of the oxygen use based on a change in pressure within the high-pressure tank with respect to time.

The pressure booster may have a boosting capacity of boosting the oxygen-enriched gas which is generated when all of the plurality of the oxygen enriching units are operating to a predetermined target pressure, and the controller may control the bypass valve such that the more the number of the oxygen enriching unit which does not operate, the more the bypassed oxygen-enriched gas is.

The bypass passage may be provided in a plural and the bypass valve comprises a plurality of bypass valves which are respectively disposed in the plural bypass passages.

The oxygen enriching unit may be an oxygen enriching device of a pressure swing adsorption type.

The pressure booster may be an AC compressor.

The pressure boosting module may further include a restart valve which is installed in an oxygen-enriched gas passage which connects the low-pressure tank and the high-pressure tank and in which the pressure booster is installed.

The restart valve may be provided in two and the restart valves are respectively disposed between the pressure booster and the low-pressure tank and between the pressure booster and the high-pressure tank, and the controller may control the restart valves to form discharge passages for discharging a residual pressure in the low-pressure tank and in the high-pressure tank for a predetermined time at restarting of the pressure booster.

Advantageous Effect

According to the present invention, since the oxygen enriching units are operated in accordance to an amount of oxygen use and the pressure booster boosts the oxygen-enriched gas to a desired pressure and a portion of the pressure-boosted oxygen-enriched gas is bypassed as input gas of the pressure booster, an oxygen supplying apparatus which generates oxygen in accordance to an amount of oxygen use and boosts the oxygen-enriched gas to a desired pressure can be realized using a pressure booster having a fixed boosting characteristic.

DETAILED DESCRIPTION OF EMBODIMENTS

Embodiments of the present invention will be described in detail with reference to the accompanying drawings.

An oxygen supplying apparatus according to an embodiment of the present invention is an apparatus which enriches oxygen concentration from supplied gas (e.g., ambient air) and supplies oxygen-enriched gas.

Figure 1:
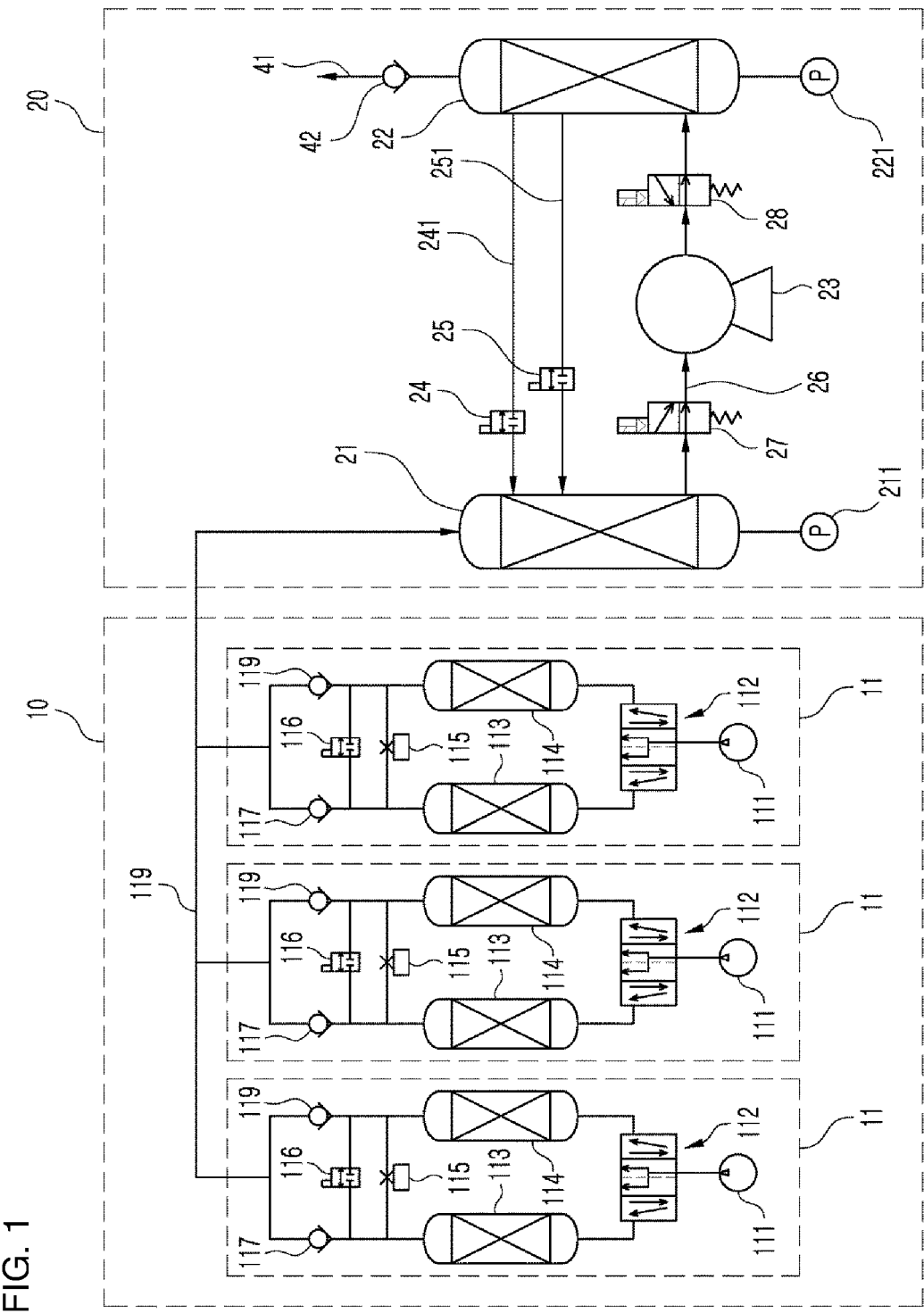
FIG. 1 is a schematic block diagram of an oxygen supplying apparatus according to an embodiment of the present invention.
Figure 2:
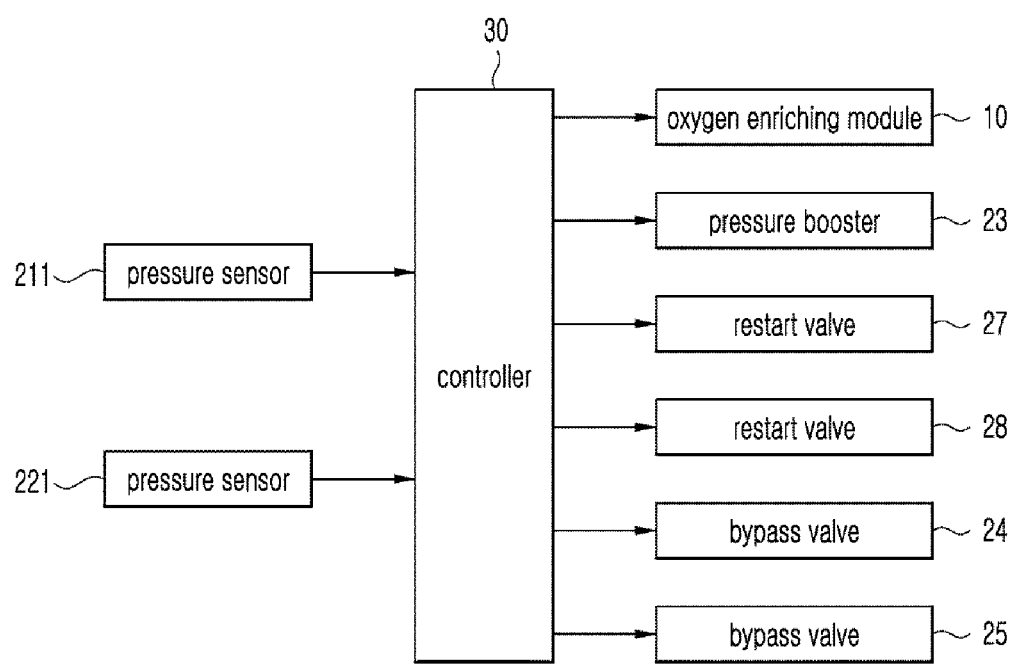
FIG. 2 is a block diagram for explanation of a control of a controller of an oxygen supplying apparatus according to an embodiment of the present invention.

An oxygen enriching module 10 enriches oxygen from gas supply to generate oxygen-enriched gas, and a pressure boosting module 20 boosts the pressure of oxygen-enriched gas generated by the oxygen enriching module 10. For example, the oxygen enriching module 10 may generate oxygen-enriched gas by removing nitrogen from ambient air, and the pressure boosting module 20 boosts the pressure of the oxygen-enriched gas generated by the oxygen enriching module 10 to a level suitable for a required purpose. Referring to FIG. 1, the oxygen-enriched gas generated by the oxygen enriching module 10 is supplied to the pressure boosting module 20 and the pressure thereof is then boosted, and as shown in FIG. 2 the oxygen enriching module 10 and the pressure boosting module 20 can be controlled by a controller 30.

The oxygen enriching module 10 includes a plurality of oxygen enriching units 11 that respectively generates oxygen-enriched gas. The respective oxygen enriching unit 11 is configured to be able to be selectively operated. Although three oxygen enriching units 11 are shown in FIG. 1, the number of the oxygen enriching unit 11 is not limited thereto.

The oxygen enriching unit 11 may be an apparatus which enriches oxygen using a pressure swing adsorption method. Concretely, the oxygen enriching unit 11 may generate oxygen-enriched gas by selectively removing nitrogen from ambient air using adsorbent having characteristic of attracting nitrogen more strongly than oxygen depending on the magnitude of pressure to enrich the concentration of oxygen. For example, referring to FIG. 1, the respective oxygen enriching unit 11 may include a compressor 111 pressurizing air and supplying the pressurized air, a flow-passage regulation valve 112, a pair of adsorption beds 113 and 114, an orifice 115, an on/off valve 116, check valves 117 and 118, etc.

The compressor 111 pressurizes air and the pressurized air is supplied to the pair of adsorption beds 113 and 114 via the flow-passage regulation valve 112. At this time, nitrogen adsorption occurs alternately in the pair of adsorption beds 113 and 114, and for such an alternate nitrogen adsorption the flow-passage regulation valve 112 is configured that the pressurized air is supplied alternately to the pair of adsorption beds 113 and 114. The flow-passage regulation valve 112 may also be configured to form a discharge passage for discharging nitrogen adsorbed in the adsorption beds 113 and 114. The adsorption beds 113 and 114 may include adsorbent such as zeolite for adsorption of nitrogen therein, and the nitrogen adsorption occurs by increase of pressure in the adsorption beds 113 and 114 caused by the supply of the pressurized air so that an oxygen-enriched gas is generated. The oxygen-enriched gas is discharged through an oxygen-enriched gas passages 119 which are connected to upper ends of the adsorption beds 113 and 114, and the adsorbed nitrogen is desorbed in pressure decrease within the adsorption beds 113 and 114 and is then discharged through a discharge passage of the flow-passage regulation valve 112. The on/off valve 116 may be installed in a passage connecting the oxygen-enriched gas passages 119 which are respectively connected to the adsorption beds 113 and 114, and in an on state thereof fluidically connects upper ends of the two adsorption beds 113 and 114 together to equalize the pressures in the two adsorption beds 113 and 114. The orifice 115 may be installed in a passage connecting the oxygen-enriched gas passages 119 of the two adsorption beds 113 and 114 and may be disposed in parallel with the on/off valve 116. The check valves 117 and 118 are installed in the oxygen-enriched gas passages 119 to allow the oxygen-enriched gas to flow only in a discharging direction. Meanwhile, although a case in which the respective oxygen enriching unit 11 is provided with the respective compressor 111 is exemplarily shown, in another embodiment it is configured that one compressor is commonly used for the plurality of oxygen enriching units. A configuration and an operation of an oxygen enriching unit of a pressure swing adsorption type are well known to an ordinarily skilled person in the art, so further detailed descriptions thereof will be omitted.

The oxygen enriching unit 11 generates oxygen-enriched gas by the alternate operation of the adsorption beds 113 and 114 and then discharges the oxygen-enriched gas, and the respective oxygen enriching unit 11 generates a predetermined amount of oxygen-enriched gas. At this time, the controller 30 selectively operates a portion or all of the plurality of the oxygen enriching units 11 to regulate the amount of the generated oxygen-enriched gas, and the controller 30 determines the number of the oxygen enriching unit 11 to be operated according to a required oxygen consumption amount or a calculated oxygen consumption amount and accordingly operates the oxygen enriching units 11 in accordance to the determined number.

The pressure boosting module 20 is supplied with oxygen-enriched gas from the oxygen enriching module 10 and boosts the pressure of the oxygen-enriched gas to a predetermined pressure. Since the pressure of the oxygen-enriched gas generated by the oxygen enriching module 10 may be less than a pressure suitable for required use, the pressure boosting module 20 boosts the pressure of the oxygen-enriched gas to a desired pressure.

Referring to FIG. 1, the pressure boosting module 20 may include a low-pressure tank 21, a high-pressure tank 22, a pressure booster 23 and bypass valves 24 and 25.

The low-pressure tank 21 is supplied with the oxygen-enriched gas from the oxygen enriching module 10 via the oxygen-enriched gas passage 119 and stores the same. At this time, a pressure sensor 211 for detecting gas pressure within the low-pressure tank 21 may be provided, and the controller 30 may output a warning signal or may perform control based on a pressure signal of the pressure sensor 211. For example, the controller 30 may output a warning signal if the gas pressure within the low-pressure tank 21 is less than predetermined low-critical pressure (e.g., −0.1 bar) since there is a possibility that air of too low pressure may be supplied, and may output a warning signal if the gas pressure within the low-pressure tank 21 is higher than predetermined high-critical pressure (e.g., 0.4 bar) since an excessive load may act on the pressure booster 23. Meanwhile, the controller 30 may control to stop an operation of the oxygen enriching unit 11 or the pressure booster 23 instead of the warning signal or together with the warning signal.

The oxygen-enriched gas within the high-pressure tank 22 may be discharged for target use, and the controller 30 may calculate an amount of oxygen consumption based on a pressure signal of the pressure sensor 221 detecting pressure within the high-pressure tank 22. For example, the controller 30 may calculate an amount of oxygen consumption using a change of pressure within the high-pressure tank 22 with respect to time.

The pressure booster 23 may be installed in an oxygen-enriched gas passage 26 connecting the low-pressure tank 21 and the high-pressure tank 22, and pressurizes the oxygen-enriched gas supplied from the low-pressure tank 21 to boost to desired pressure and then supplies to the high-pressure tank 22. The pressure booster 23 may be an AC compressor, and in more detail may be an AC compressor in a wobble piston type. In an embodiment of the present invention, instead of a BLDC compressor which can easily respond to a change of used amount due to a variable pressurizing characteristic but is expensive, an amount of generated oxygen-enriched gas depending on a change of use amount using an AC compressor which is relatively inexpensive. Further, in an embodiment of the present invention, while using an AC compressor having a fixed pressurizing characteristic, the oxygen-enriched gas in the high-pressure tank 22 is bypassed to the low-pressure tank 21 in order to regulate an amount of the generated oxygen-enriched gas in accordance to a change of an amount of oxygen consumption and in order to secure a stable pressure boosting.

Restart valves 27 and 28 for eliminating a residual pressure in restarting of the pressure booster 23 may be provided in order to secure a stable operation of the pressure booster 23. As shown in FIG. 1, the restart valves 27 and 28 may be respectively disposed upstream and downstream the pressure booster 23 in the oxygen-enriched gas passage 26. The restart valves 27 and 28 may be respectively formed as a three-port/two-way valve an outlet of which is connected to one of the outside and the oxygen-enriched gas passage 26. The controller 30 controls the restart valves 27 and 28 such that the outlets thereof are communicated to the outside for a predetermined time at the restarting of the pressure booster 23 so as to discharge the residual pressure in the low-pressure tank 21 and the high-pressure tank 22 to the outside so as to reduce load acting on the pressure booster 23. During the normal operation, the restart valves 27 and 28 may be controlled to form passages allowing the oxygen-enriched gas to pass through the oxygen-enriched gas passage 26.

The high-pressure tank 22 stores oxygen-enriched gas pressure-boosted by the pressure booster 23, and an oxygen discharging port 41 for discharging product oxygen (i.e., pressure-boosted oxygen-enriched gas) may be connected to the high-pressure tank 22. A check valve 42 which allows discharge of oxygen and prevents backward flowing of outside air may be installed in the oxygen discharging port 41. The oxygen discharged through the oxygen discharging port 41 may be used for desired purposes. Meanwhile, a pressure sensor 221 for detecting gas pressure in the high-pressure tank 22 may be provided, and the controller 30 may output a warning signal or perform a predetermined control based on a pressure signal of the pressure sensor 221. The controller 30 may calculate an amount of oxygen consumption based on gas pressure within the high-pressure tank 22 detected by the pressure sensor 221 installed in the high-pressure tank 22.

The bypass valves 24 and 25 play a role of selectively bypassing a portion of pressure-boosted oxygen-enriched gas within the high-pressure tank 22 backward to the low-pressure tank 21. The bypass valves 24 and 25 may be respectively installed in bypass passages 241 and 251 communicating the high-pressure tank 22 and the low-pressure tank 21 and may be realized as an on/off valve which selectively turns on/off the bypass passages 241 and 251. Although two bypass valves 24 and 25 are exemplarily shown, the number of the bypass valve is not limited thereto and a plurality of bypass valves having different allowable flow rate may also be provided. If the two bypass valves 24 and 25 are both in an off-state, the pressure-boosted oxygen-enriched gas is not bypassed. If the two bypass valves 24 and 25 are both in on-state, an amount of the bypassed pressure-boosted oxygen-enriched gas becomes maximum. Meanwhile, if only one of the two bypass valves 24 and 25 is in an on-state, an amount of the bypassed pressure-boosted oxygen-enriched gas less than the maximum amount of the bypassed gas is bypassed, and at this time, if the two bypass valves 24 and 25 have different allowable flow rates, the amount of the bypassed gas may be different from one another in cases when one of the bypasses valves is in an on-state.

The controller 30 may control the oxygen enriching module 10 such that the number of the operating unit among the plurality of the oxygen enriching units 11 is proportional to an amount of the oxygen use. The controller 30 may control the bypass valves 24 and 25 such that an amount of the bypassed oxygen-enriched gas from the high-pressure tank 22 to the low-pressure tank 21 via the bypass valves 24 and 25 is inversely proportional to the number of the oxygen enriching unit 11 which is being operated.

The pressure booster 23 may have a boosting capacity for boosting the pressure of oxygen-enriched gas which is generated when all of the plurality of the oxygen enriching units 11 of the oxygen enriching module 10 operate to a desired pressure. For example, in case that three oxygen enriching units 11 respectively generating 20 lpm (liter per minute) of oxygen-enriched gas are provided, the pressure booster 23 may have a boosting capacity of boosting 60 lmp of the oxygen-enriched gas to a desired pressure (e.g., 6 bar). In this case, the controller 30 may selectively operate one, two or all of the oxygen enriching units 11 in accordance with an amount of oxygen use so as to generate 20 lpm, 40 lpm or 60 lpm of oxygen-enriched gas, and the controller 30 may control the bypass valves 24 and 25 to bypass an amount of the bypassed oxygen-enriched gas which is reversely proportional to the amount of oxygen use gas, i.e., proportional to the number of the oxygen enriching unit which is not operated. For example, when a smallest amount of oxygen is required under the condition that an amount of oxygen use is divided into three steps, the controller 30 operates only one among the three oxygen enriching units 11 and turns on both of the two bypass valves 24 and 25 to make an amount of the bypassed gas maximum to supplement the shortage of the oxygen-enriched gas supplied to the pressure booster 23. Meanwhile, when a middle amount of oxygen is required, the controller 30 may operate two among the three oxygen enriching units 11 and turns on only one of the two bypass valves 24 and 25 to supplement the shortage of the oxygen-enriched gas supplied to the pressure booster 23. Further, when a largest amount of oxygen is required, the controller 30 operates all of the oxygen enriching units 11 and turns off all of the bypass valves 24 and 25 since a sufficient amount of the oxygen-enriched gas is supplied to the pressure booster 23 for stable operation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An oxygen supplying apparatus comprising:
an oxygen enriching module including a plurality of oxygen enriching units which respectively generate oxygen-enriched gas and are respectively configured to be selectively operated;
a pressure boosting module which receives the oxygen-enriched gas from the oxygen enriching module and boosts pressure of the oxygen-enriched gas; and
a controller controlling operations of the oxygen enriching module and the pressure boosting module,
wherein the pressure boosting module comprises:
a low-pressure tank which receives and stores the oxygen-enriched gas from the oxygen enriching module;
a pressure booster which boosts pressure of the oxygen-enriched gas discharged from the low-pressure tank;
a high-pressure tank stores the oxygen-enriched gas pressure-boosted by the pressure booster; and
at least one bypass valve which is provided to a bypass passage for bypassing a portion of the pressure-boosted oxygen-enriched gas stored in the high-pressure tank to the low-pressure tank to regulate bypassing of the oxygen-enriched gas from the high-pressure tank to the low-pressure tank.

2. The oxygen supplying apparatus of claim 1, wherein the controller controls the oxygen enriching module such that the number of the oxygen enriching unit which is operating among the plurality of the oxygen enriching units is proportional to an amount of oxygen use, and wherein the controller controls the at least one bypass valve such that an amount of the oxygen-enriched gas bypassed from the high-pressure tank to the low-pressure tank via the at least one bypass valve is reversely proportional to the number of the oxygen enriching unit which is operating.

3. The oxygen supplying apparatus of claim 2, wherein the controller calculates the amount of the oxygen use based on a change in pressure within the high-pressure tank.

4. The oxygen supplying apparatus of claim 3, wherein the controller calculates the amount of the oxygen use based on a change in pressure within the high-pressure tank with respect to time.

5. The oxygen supplying apparatus of claim 1, wherein the pressure booster has a boosting capacity for boosting the oxygen-enriched gas which is generated when all of the plurality of the oxygen enriching units are operating to a predetermined target pressure, and wherein the controller controls the at least one bypass valve such that the more the number of the oxygen enriching units which does not operate, the more the bypassed oxygen-enriched gas is.

6. The oxygen supplying apparatus of claim 1, wherein the bypass passage is provided in a plural and the at least one bypass valve comprises a plurality of bypass valves which are respectively disposed in the plural bypass passages.

7. The oxygen supplying apparatus of claim 1, wherein the oxygen enriching units are oxygen enriching devices of a pressure swing adsorption type.

8. The oxygen supplying apparatus of claim 1, wherein the pressure booster is an AC compressor.

9. The oxygen supplying apparatus of claim 1, wherein the pressure boosting module further comprises a restart valve which is installed in an oxygen-enriched gas passage which connects the low-pressure tank and the high-pressure tank and in which the pressure booster is installed.

10. The oxygen supplying apparatus of claim 9, wherein the restart valve is provided in two and the restart valves are respectively disposed between the pressure booster and the low-pressure tank and between the pressure booster and the high-pressure tank, and wherein the controller controls the restart valves to form discharge passages for discharging a residual pressure in the low-pressure tank and in the high-pressure tank for a predetermined time at restarting of the pressure booster.

* * * * *